United States Patent
Kominar

(10) Patent No.: US 9,779,474 B2
(45) Date of Patent: Oct. 3, 2017

(54) SYSTEM AND METHOD FOR ELECTRONIC DEVICE DISPLAY PRIVACY

(71) Applicant: BlackBerry Limited, Waterloo (CA)

(72) Inventor: Jeremy Lawson Kominar, Waterloo (CA)

(73) Assignee: BlackBerry Limited, Waterloo (CA)

( * ) Notice: Subject to any disclaimer, the term of this patent is extended or adjusted under 35 U.S.C. 154(b) by 163 days.

(21) Appl. No.: 14/245,512

(22) Filed: Apr. 4, 2014

(65) Prior Publication Data

US 2015/0287164 A1 Oct. 8, 2015

(51) Int. Cl.
| G06T 3/00 | (2006.01) |
| G06T 15/20 | (2011.01) |
| G06T 1/00 | (2006.01) |
| G09G 5/00 | (2006.01) |
| H04N 1/00 | (2006.01) |

(52) U.S. Cl.
CPC .............. *G06T 3/0093* (2013.01); *G06T 1/00* (2013.01); *G06T 15/20* (2013.01); *G09G 5/00* (2013.01); *H04N 1/00* (2013.01); *G09G 2320/068* (2013.01); *G09G 2340/10* (2013.01); *G09G 2358/00* (2013.01)

(58) Field of Classification Search
CPC .................................................. G06T 3/0093
USPC ........................................................ 345/647
See application file for complete search history.

(56) References Cited

U.S. PATENT DOCUMENTS

| 6,463,299 B1* | 10/2002 | Macor ....................... G06F 1/16 379/110.01 |
| 2002/0113912 A1* | 8/2002 | Wright .................. G03B 13/04 349/13 |
| 2004/0077314 A1* | 4/2004 | Sun ........................ H04L 63/105 455/41.2 |
| 2005/0235217 A1* | 10/2005 | Hoe-Richardson ..... G06F 21/84 715/768 |
| 2006/0181763 A1* | 8/2006 | De Zwart ............... G02F 1/167 359/296 |
| 2006/0247919 A1* | 11/2006 | Specht .................... G10L 21/06 704/201 |
| 2010/0124363 A1* | 5/2010 | Ek .......................... G06F 21/32 382/118 |
| 2010/0205667 A1* | 8/2010 | Anderson ............... G06F 3/013 726/19 |
| 2010/0259560 A1* | 10/2010 | Jakobson ................ G06F 21/62 345/629 |
| 2011/0248987 A1* | 10/2011 | Mitchell ................. G06T 15/20 345/419 |
| 2012/0026376 A1* | 2/2012 | Goran .................. H04N 9/3173 348/333.1 |

(Continued)

OTHER PUBLICATIONS

Extended European Search Report; EP 15160923.7; May 29, 2015.

(Continued)

*Primary Examiner* — Javid A Amini
(74) *Attorney, Agent, or Firm* — Ridout and Maybee LLP

(57) ABSTRACT

An electronic device and associated method is provided. The electronic device comprises a processor; a display coupled to the processor, the display for displaying an image; a memory coupled to the processor; and a security module saved in the memory. The security module configures the processor to apply obfuscation to the image displayed on the display when a privacy mode is engaged on the electronic device.

25 Claims, 5 Drawing Sheets

(56) References Cited

U.S. PATENT DOCUMENTS

| | | | |
|---|---|---|---|
| 2013/0044124 A1* | 2/2013 | Reichert, Jr. | G06T 3/00 345/618 |
| 2013/0063457 A1* | 3/2013 | Borgers | G09G 3/3648 345/530 |
| 2013/0155182 A1* | 6/2013 | Bekiares | H04N 5/23203 348/36 |
| 2013/0182083 A1* | 7/2013 | Grossmann | H04N 13/0402 348/51 |
| 2013/0187950 A1* | 7/2013 | Nowatzyk | G09G 3/003 345/633 |
| 2013/0215101 A1* | 8/2013 | Duan | G09G 5/32 345/419 |
| 2013/0321452 A1* | 12/2013 | Kawalkar | G09G 3/20 345/629 |
| 2014/0063008 A1* | 3/2014 | Mitchell | G06T 15/20 345/419 |
| 2014/0115338 A1* | 4/2014 | Faith | H04L 63/0428 713/176 |
| 2014/0327694 A1* | 11/2014 | Cao | H04N 13/0422 345/597 |
| 2015/0104103 A1* | 4/2015 | Candelore | G06K 9/00288 382/195 |

OTHER PUBLICATIONS

Communication pursuant to Article 94(3) EPC; EP 15160923.7; Jul. 6, 2017.

"Computer Security Lockout Policy", May 20 2005 (May 20 2005), Retrieved from the Internet:URL:http://www.auxs.umn.edu/assets/pdf/ComputerScreenSaverPolicy.pdf [retrieved on Jun. 6 2017].

"Password Protected Screen Saver Policy", May 22 2009 (May 22 2009), Retrieved from the Internet: [retrieved on Jun. 26 2017].

Christopher Brenner: "Password Protected Screensaver Policy"15 Feb. 2011 (2011-02-15), Retrieved from the Internet:Url:https://lsaurnich.edu/content/dam/Isait-assets/Isait-documents/Lsa-screensaver- Policy2.pdf [retrieved an 2017-06-26].

\* cited by examiner

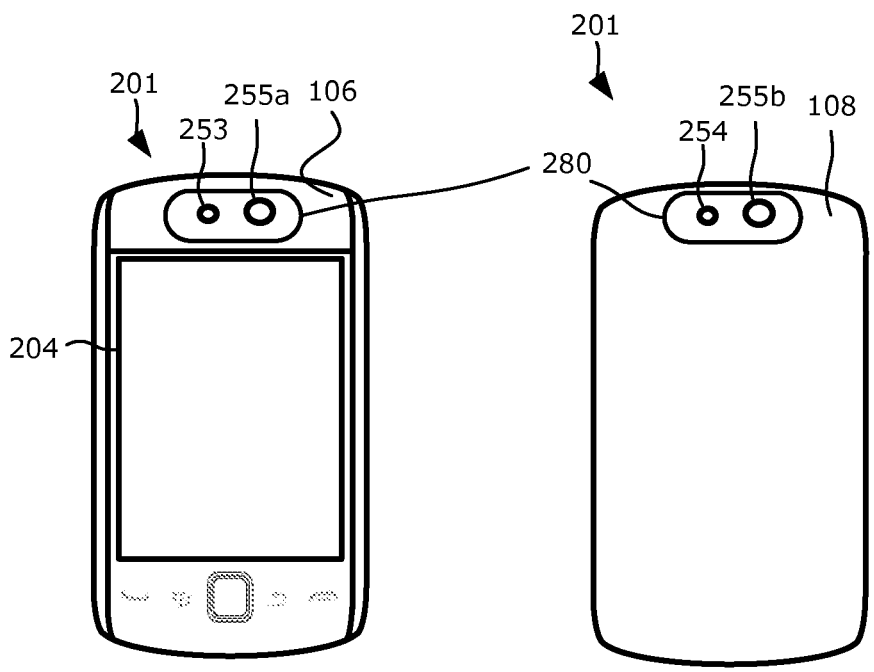

SYSTEM AND METHOD FOR ELECTRONIC DEVICE DISPLAY PRIVACY

FIELD

The present application is generally related to security on electronic devices, and more particularly to preventing unauthorized observation of a display screen on an electronic device.

BACKGROUND

Communication devices such as mobile communication devices are equipped with display screens, which can sometimes be observed by third parties, thereby presenting potentially serious security concerns. Solutions are needed to prevent unauthorized observers from seeing content on the display of an electronic device when sensitive content is being viewed.

BRIEF DESCRIPTION OF DRAWINGS

In order that the subject matter may be readily understood, embodiments are illustrated by way of examples in the accompanying drawings, in which:

FIG. 1 is a front elevation view of an example electronic device in accordance with example aspects of the present disclosure;

FIG. 2 is a rear elevation view of the example electronic device of FIG. 1 in accordance with example aspects of the present disclosure;

DETAILED DESCRIPTION

Figure 3:
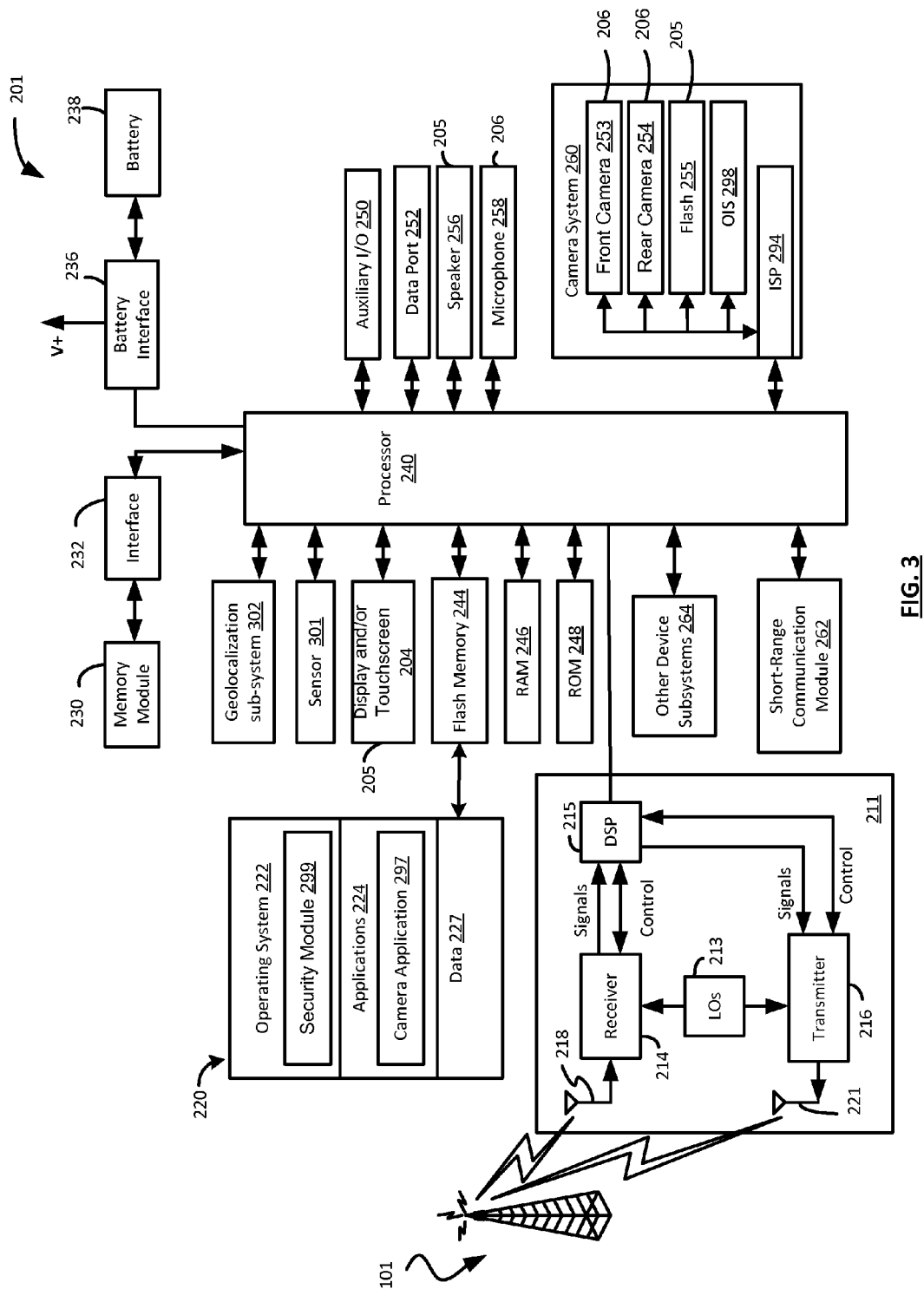
FIG. 3 is a block diagram illustrating components of the example electronic device of FIG. 1 in accordance with example aspects of the present disclosure.

In accordance with an aspect of the present description, described is a method of implementing a privacy mode on an electronic device having a processor coupled to a display and a memory, the method comprising: applying obfuscation to an image displayed on the display when the privacy mode is engaged on the electronic device.

In accordance with another aspect, described is an electronic device comprising a processor; a display coupled to the processor, the display for displaying an image; a memory coupled to the processor; and a security module saved in the memory. The security module configures the processor to apply obfuscation to the image displayed on the display when a privacy mode is engaged on the electronic device.

In accordance with another aspect, described is a non-transitory computer-readable medium storing program instructions that when executed by an electronic device, cause the electronic device to perform a method of implementing a privacy mode on an electronic device. The method comprises applying obfuscation to an image displayed on a display when the privacy mode is engaged on the electronic device.

The obfuscation may include at least one of: anamorphic rendering applied to the image such that the image is clearly visible only from a selected viewing position, perspective rendering applied to the image such that the image is clearly visible only from the selected viewing position, three dimensional (3D) rendering applied to the image such that the image is clearly visible only from the selected viewing position, applying a second image to a background of the image such that the image becomes more difficult to discern, applying a blur to the image such that the image becomes more difficult to discern, and applying a blur to a portion of the image such that the image becomes more difficult to discern.

A common problem in the world of security for mobile communication devices is preventing an unauthorized individual from obtaining sensitive information by watching the user use the device or by viewing the screen of the device when the user is using the device. This problem is commonly referred to as "shoulder surfing" when the unauthorized individual stands behind or next to a user for the purpose of observing the user's input or reading content of the screen from the mobile communication device.

In one example, to address one or more of the above-noted problems, anamorphosis may be applied to text or other features shown on a display of the mobile communication device. Anamorphosis may be considered to be a form of perspective. Perspective is well known to graphic artists in that objects that are rendered with perspective typically appear three dimensional and project to a vanishing point off in the distance. Sometimes objects are drawn to appear to be three dimensional, but may not project to a vanishing point or the vanishing point may be so far off in the distance that the projection is not readily apparent to the observer.

Anamorphosis may obey most or all of the laws of perspective. In some examples, anamorphosis may be considered an extreme form of perspective in that an anamorphic picture is usually distorted in some way. To remove the distortion of an anamorphic image and bring the image back to the way one would normally expect to see the image, the image may have to be viewed in a special way because the viewer of the anamorphic image may have to look at the image in a particular way or from a special point such that, in normal circumstances, only one person at a time can see the image correctly.

Exemplary anamorphic images may not always make sense unless the viewer knows how or where to place his eyes. Some anamorphic images may be hidden until the viewer views the image from the correct position.

The following definitions are applied throughout the present disclosure: Three dimensional imaging or rendering may generally refer to any effect applied to a two dimensional image or object on a page or display that makes the image or object appear three dimensional. Perspective may be a subset of three dimensional imaging in that when perspective is applied, the image or object projects to at least one vanishing point off in the distance. Anamorphosis may further be a subset of perspective, in that anamorphosis may be considered an extreme form of perspective in that an anamorphic picture is usually distorted in some way.

Taking a page from the concept of anamorphosis, if the surface of an electronic device such as a smartphone or tablet computer is considered to be a plane in 3D space that can be rotated, and if one considers a second plane within the display of the electronic device not parallel to the plane of the smartphone or tablet computer (assuming that the space inside the display of the electronic device exists in 3D space instead of 2D space), all usual screen content can be rendered to that second plane and drawn on the display in a similar way that street artists render incredibly realistic 3D images on stretches of a two dimensional street. By rendering display content within the display on the second plane, the perception of depth can be created which is used for the principle of anamorphosis to work. Anamorphic art style relies on the viewer being at a fairly precise vantage point to be able to observe the anamorphic images correctly, such that other viewers situated at other vantage points will see potentially incomprehensible or stretched and/or distorted images. In other words, two people can be standing right next to each other looking at the same image and actually see two different images.

Applying the concept of anamorphosis to an electronic device, by rotating the electronic device when held in a hand, the user could "set" his or her viewing position and engage a privacy mode, such as an anamorphic privacy mode of the electronic device, which makes it difficult for others to observe the display on the electronic device. In action, the electronic device may display some text that the user may use to calibrate the privacy mode or find an optimum comfortable viewing position for the user to hold or rest the electronic device, such as in a hand, propped up on a table, etc. The user may then engage the anamorphic privacy mode, where, when the device is NOT held in this position (e.g., potentially laying on the table until the user needs to read another message again) the screen may appear obfuscated, distorted and/or illegible. However, when the electronic device is held in approximately the proper position and/or orientation and the viewer is in the selected viewing position, the display content may become clearly legible, while remaining at least partially illegible to others located at different viewing positions.

In one example, a user may be sitting next to a 3rd party on an airplane. The user may use aspects of the present disclosure implemented on his electronic device so that the 3rd party sitting next to him has difficulty reading the display of the electronic device. Normally, it would be quite easy for the 3rd party to glance over at the user's display when the people are confined to a small space, so the user may engage and/or calibrate a special privacy mode (e.g., an anamorphic privacy mode) by holding his device out in front of him and tipping it forward slightly and then engaging the privacy mode. In the present example, now only the user has the appropriate viewing position to observe the contents of his display clearly. With the privacy mode enabled, the user can read his private emails in public without fear of the 3rd party being able to read them too. The user may also rest his electronic device in front of him without fear of the 3rd party being able to easily read what is on the display because, in the rest position, no one may have the correct viewing position to see the contents of the display. When the user wants to read more, the user simply picks up the electronic device and returns the electronic device to the position he previously chose during calibration when engaging the privacy mode.

Example Communication Device

Referring first to FIG. 1, a front view of an example electronic device 201 is illustrated. The electronic device 201 can be a mobile phone, portable computer, smartphone, tablet computer, personal digital assistant, a wearable computer such as a watch, a television, a digital camera or a computer system, for example. The electronic device 201 may be of a form apart from those specifically listed above.

FIG. 1 illustrates a front view of the electronic device 201. The front view of the electronic device 201 illustrates a front face 106 of the electronic device 201. The front face 106 of the electronic device 201 is a side of the electronic device 201 which includes a main display 204 of the electronic device 201. The front face 106 of the electronic device 201 is a side of the electronic device 201 which is configured to be viewed by a user. The front face 106 also includes a front facing camera 253, and optionally a flash 255a.

FIG. 2 illustrates a rear view of the electronic device 201. The rear view of the electronic device 201 illustrates a rear face 108 of the electronic device 201. The rear face 108 is a side of the electronic device 201 that does not include a main display 204 of the electronic device 201. In the example illustrated, the rear face 108 is a side of the electronic device 201 that is opposite the front face 106 (FIG. 1) of the electronic device 201. That is, the rear face 108 may be substantially parallel to the front face 106 of the electronic device 201. The rear face 108 also includes a rear facing camera 254, and optionally a flash 255b.

The electronic device 201 includes one or more cameras 253, 254. The cameras 253, 254 are configured to generate camera media, such as images in the form of still photographs, motion video or another type of camera data. The camera media may be captured in the form of an electronic signal which is produced by an image sensor associated with the camera 253, 254. Components other than the image sensor may be associated with the camera 253, 254, although such other components may not be shown in the Figures. More particularly, the image sensor (not shown) is configured to produce an electronic signal in dependence on received light. That is, the image sensor converts an optical image into an electronic signal, which may be output from the image sensor by way of one or more electrical connectors associated with the image sensor. The electronic signal represents electronic image data (which may also be referred to as camera media or camera data) from which information referred to as image context may be computed.

In the example illustrated, the electronic device 201 includes a rear facing camera 254. A rear facing camera is a camera 254 that is located to obtain images of a subject near a rear face 108 of the electronic device 201. That is, the rear facing camera may be located on or near a rear face 108 of the electronic device 201.

The electronic device 201 also includes a front facing camera 253 instead of or in addition to the rear facing camera 254. The front facing camera 253 is a camera which is located to obtain images of a subject near the front face 106 of the electronic device 201. That is, the front facing camera may be generally located at or near a front face 106 of the electronic device 201. The front facing camera may be located anywhere on the front surface of the electronic device; for example, the front facing camera may be located above or below the display 204. In at least some examples, the front facing camera 253 may be provided in a central location relative to the display 204 to facilitate image acquisition of a face. In at least some embodiments, the front facing camera 253 may be used, for example, to allow a user of the electronic device 201 to engage in a video-based chat with a user of another electronic device 201. In at least some embodiments, the front facing camera 253 is mounted internally within a housing of the electronic device 201 beneath a region of the front face 106 which transmits light. For example, the front facing camera 253 may be mounted beneath a clear portion of the housing which allows light to be transmitted to the internally mounted camera.

In at least some examples, the electronic device 201 may include both the front facing camera 253 and also the rear facing camera 254. The rear facing camera 254 may obtain images which are not within the field of view of the front facing camera 253. The fields of view of the front facing and rear facing cameras may generally be in opposing directions.

The electronic device 201 includes one or more flashes 255a and 255b, collectively referred to as flash 255. The flash 255 may, in at least some examples, be a light emitting diode (LED) flash. The flash 255 emits electromagnetic radiation. More particularly, the flash 255 may be used to produce a brief bright light which may facilitate picture-taking in low light conditions. That is, the flash 255 may emit light while an image is captured using the cameras 253, 254. In the example illustrated, the flash 255b is located to emit light at the rear face 108 of the electronic device 201. That is, the flash 255b is a rear-facing flash. The electronic device 201 may include the front-facing flash 255a instead of or in addition to the rear facing flash 255b to emit light at the front face 106 of the electronic device 201. The electronic device 201 may have additional camera hardware which may complement the cameras 253, 254.

Still referring to FIG. 2, transparent covers 280 cover the image sensors of the cameras 253, 254 and the flash 255. The transparent cover 280 allows light to pass through (e.g. from the flash 255 to the exterior of the housing or from the exterior of the housing to the image sensor) and prevents debris or dirt from entering into the housing. Dirt or debris that could otherwise enter into the housing could potentially damage the components of the camera 253, 254 and flash 255. In the example illustrated in FIG. 2 transparent covers 280 are secured to the housing. For example, the transparent covers 280 may be secured to the housing using an adhesive or using snaps or similar attachment mechanism in such a manner so as to be flush with the housing. The transparent covers 280 can be transparent and made out of glass or plastic or another suitable transparent or translucent material. For example, the cover 280 can be made out of stained or partially stained glass.

Referring now to FIG. 3, a block diagram of an example electronic device 201 is illustrated. The electronic device 201 of FIG. 3 may include a housing which houses components of the electronic device 201. Internal components of the electronic device 201 may be constructed on a printed circuit board (PCB). The electronic device 201 includes a controller including at least one processor 240 (such as a microprocessor) which controls the overall operation of the electronic device 201. The processor 240 interacts with components or device subsystems such as a wireless communication subsystem 211 for exchanging radio frequency signals with a wireless network 101 to perform communication functions. The processor 240 interacts with additional device subsystems including one or more input interfaces 206 (such as a keyboard, one or more control buttons, one or more microphones 258, one or more cameras 253, 254, and/or a touch-sensitive overlay associated with a touch-screen display), flash memory 244, random access memory (RAM) 246, read only memory (ROM) 248, auxiliary input/output (I/O) subsystems 250, a data port 252 (which may be a serial data port, such as a Universal Serial Bus (USB) data port), one or more output interfaces 205 (such as a display 204 (which may be a liquid crystal display (LCD)), a flash 255, one or more speakers 256, or other output interfaces), a short range communication module 262, and other device subsystems generally designated as 264. Some of the components or subsystems shown in FIG. 3 perform communication-related functions, whereas other components or subsystems may provide "resident" or on-device functions.

The electronic device 201 may include a touchscreen display 204. The touchscreen display 204 may be constructed using a touch-sensitive input surface connected to an electronic controller. The touch-sensitive input surface overlays the display 204 and may be referred to as a touch-sensitive overlay. The touch-sensitive overlay and the electronic controller provide a touch-sensitive input interface 206 and the processor 240 interacts with the touch-sensitive overlay via the electronic controller. That is, the touchscreen display 204 acts as both an input interface 206 and an output interface 205.

The communication subsystem 211 includes a receiver 214, a transmitter 216, and associated components, such as one or more antenna elements 218 and 221, local oscillators (LOs) 213, and a processing module such as a digital signal processor (DSP) 215. The antenna elements 218 and 221 may be embedded or internal to the electronic device 201 and a single antenna may be shared by both receiver 214 and transmitter 216. The particular design of the wireless communication subsystem 211 depends on the wireless network 101 in which the electronic device 201 is intended to operate.

The electronic device 201 may communicate with any one of a plurality of fixed transceiver base stations of the wireless network 101 within its geographic coverage area. The electronic device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 215. In a similar manner, signals to be transmitted are processed, including modulation and encoding, for example, by the DSP 215. These DSP-processed signals are input to the transmitter 216 for digital-to-analog (D/A) conversion, frequency up conversion, filtering, amplification, and transmission to the wireless network 101 via the antenna 221. The DSP 215 not only processes communication signals, but may also provide for receiver and transmitter control. For example, the gains applied to communication signals in the receiver 214 and the transmitter 216 may be adaptively controlled through automatic gain control algorithms implemented in the DSP 215.

In some examples, the auxiliary input/output (I/O) subsystems 250 may include an external communication link or interface, for example, an Ethernet connection. The electronic device 201 may include other wireless communication interfaces for communicating with other types of wireless networks; for example, a wireless network such as an orthogonal frequency division multiplexed (OFDM) network.

In some example embodiments, the electronic device 201 also includes a removable memory module 230 (typically including flash memory) and a memory module interface 232. Network access may be associated with a subscriber or user of the electronic device 201 via the memory module 230, which may be a Subscriber Identity Module (SIM) card for use in a GSM network or other type of memory module for use in the relevant wireless network type. The memory module 230 may be inserted in or connected to the memory module interface 232 of the electronic device 201.

The electronic device 201 may store data 227 in an erasable persistent memory, which in one example embodiment is the flash memory 244. In various examples, the data 227 may include service data having information used by the electronic device 201 to establish and maintain communication with the wireless network 101. The data 227 may also include user application data such as email messages, address book and contact information, calendar and schedule information, notepad documents, images, and other commonly stored user information stored on the electronic device 201 by its user, and other data. The data 227 may, in at least some examples, include metadata which may store information about the images. In some embodiments the metadata and the images may be stored together. That is, a single file may include both an image and also metadata regarding that image. For example, in at least some embodiments, the image may be formatted and stored as a JPEG image.

The data 227 stored in the persistent memory (e.g. flash memory 244) of the electronic device 201 may be organized, at least partially, into a number of databases or data stores each containing data items of the same data type or associated with the same application. For example, email messages, contact records, and task items may be stored in individual databases within the electronic device 201 memory.

The data port 252 may be used for synchronization with a user's host computer system. The data port 252 enables a user to set preferences through an external device or software application and extends the capabilities of the electronic device 201 by providing for information or software downloads to the electronic device 201 other than through the wireless network 101. The alternate download path may, for example, be used to load an encryption key onto the electronic device 201 through a direct, reliable and trusted connection to thereby provide secure device communication.

In some examples, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects his electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable Bluetooth® connection to the host computer for processing. Further, data may be transmitted to and from the electronic device 201 using a WiFi network or using near field communication technologies.

The electronic device 201 also includes a battery 238 as a power source, which is typically one or more rechargeable batteries that may be charged, for example, through charging circuitry coupled to a battery interface 236 such as the serial data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The short range communication module 262 provides for communication between the electronic device 201 and different systems or devices, which need not necessarily be similar devices. For example, the short range communication module 262 may include an infrared device and associated circuits and components, or a wireless bus protocol compliant communication mechanism such as a Bluetooth® communication module to provide for communication with similarly-enabled systems and devices.

The electronic device 201 can also include one or more sensors 301 such as temperature sensor, rotation sensors (for example, a gyroscope), translation sensors (for example accelerometers), position sensors (for example, magnetometers), and sensor sub-systems such as a geolocalization sub-system 302, which can be based on a global positional signal. The sensors 301 may be used by aspects of the present disclosure for ascertaining the position of the electronic device 201 in space relative to a user so that the electronic device 201 is able to properly render content on the display 204 that is viewable from a selected viewing position of the user.

The cameras 253, 254 are included in a camera system 260 along with a flash 255, an optical image stabilizer (OIS) 298 and an image signal processor (ISP) 294. The optical image stabilizer (OIS) 298 may be integrated with the cameras 253, 254 or it may be a separate component. For example, the OIS 298 may be considered as a functional part of the camera system 260. Similarly, the ISP 294 may be embedded in the processor 240 and it may also be considered as a functional part of the camera system 260. In at least some examples, the cameras 253, 254 may be associated with a dedicated image signal processor 294 which may provide at least some camera-related functions, with the image signal processor 294 being either embedded in the cameras 253, 254 or a separate device. For example, in at least some embodiments, the image signal processor 294 may be configured to provide auto-focusing functions. Functions or features which are described below with reference to the camera application 297 may, in at least some embodiments, be provided, in whole or in part, by the image signal processor 294.

The camera system 260 associated with the electronic device 201 also includes a flash 255. As noted above, the flash 255 is used to illuminate a subject while the cameras 253, 254 capture an image of the subject. The flash 255 may, for example, be used in low light conditions. In the example illustrated, the flash 255 is coupled with the main processor 240 of the electronic device 201. The flash 255 may be coupled to the image signal processor 294, which may be used to trigger the flash 255. The image signal processor 294 may, in at least some embodiments, control the flash 255. In at least some such embodiments, applications associated with the main processor 240 may be permitted to trigger the flash 255 by providing an instruction to the image signal processor 294 to instruct the image signal processor 294 to trigger the flash 255. In one or more embodiments, the image signal processor 294 may be coupled to the processor 240.

The optical image stabilizer 298 can be coupled to the camera 253 or the image signal processor 294 or both and operates to stabilize the camera 253 during an image capture. The optical image stabilizer 298 may receive instructions from the image signal processor 294. Similarly, the optical image stabilizer 298 may be coupled to the processor 240 and may receive instructions from the processor 240. The image signal processor 294 may obtain data from the optical image stabilizer 298 relating to its movement and operation. In one or more embodiments, the camera system 260 may have a separate memory (not shown) on which the image signal processor 294 can store data and retrieve instructions. Such instructions may, for example, have been stored in the memory by the processor 240, which may in some embodiments also be coupled to the separate memory in the camera system 260.

A predetermined set of applications 224 that control basic device operations, including data and possibly voice communication applications may be installed on the electronic device 201 during or after manufacture. Additional applications 224 and/or upgrades to an operating system 222 or software applications 224 may also be loaded onto the electronic device 201 through the wireless network 101, the auxiliary I/O subsystem 250, the data port 252, the short range communication module 262, or other suitable device subsystems 264. The downloaded applications or upgrades may be permanently installed; for example, written into the program memory (e.g. the flash memory 244), or written into and executed from the RAM 246 for execution by the processor 240 at runtime.

The electronic device 201 may have a security module 299, which may be implemented as part of the operating system 222. Alternatively, the security module 299 may be installed as one of the applications 224. The security module 299 may implement many or all of the security features of the electronic device 201, such as password entry, voice detection, face detection and/or face recognition, data encryption, display obfuscation, etc. The security module 299 may operate in communication with other applications or module, such as the camera application 297, for receiving data from one or both of the cameras 253, 254. The security module 299 may also receive signals from sensors 301, such as an accelerometer, gyroscope, and/or magnetometer for determining the position of the electronic device 201 in space.

In some example embodiments, the electronic device 201 may provide two principal modes of communication: a data communication mode and a voice communication mode. In the data communication mode, a received data signal such as a text message, an email message, or webpage download will be processed by the communication subsystem 211 and input to the processor 240 for further processing. For example, a downloaded webpage may be further processed by a web browser or an email message may be processed by the email messaging application and output to the display 204. A user of the electronic device 201 may also compose data items, such as email messages; for example, using an input interface 206 in conjunction with the display 204. These composed items may be transmitted through the communication subsystem 211 over the wireless network 101.

In the voice communication mode, the electronic device 201 provides telephony functions and may operate as a typical cellular phone. The overall operation is similar to the data communication mode, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input devices). Alternative voice or audio I/O subsystems, such as a voice message recording subsystem, may also be implemented on the electronic device 201. Although voice or audio signal output may be accomplished primarily through the speaker 256, the display 204 may also be used to provide an indication of the identity of a calling party, duration of a voice call, or other voice call related information.

The processor 240 operates under stored program control and executes software modules 220, such as applications 224, stored in memory such as persistent memory; for example, in the flash memory 244. As illustrated in FIG. 3, the software modules 220 may include the operating system software 222 and one or more additional applications 224 or modules such as, for example, the camera application 297. The processor 240 may also operate to process data 227 stored in memory associated with the electronic device 201.

In the example of FIG. 3, the camera application 297 is illustrated as being implemented as a stand-alone application 224. However, in other examples, the camera application 297 could be provided by another application 224 or module such as, for example, the operating system software 222 or, in some examples, the security module 299. Likewise, while the security module 299 is shown as being implemented as part of the operating system 222, alternatively the security module 299 could be implemented as an application 224.

The software modules 220 or parts thereof may be temporarily loaded into volatile memory such as RAM 246. The RAM 246 is used for storing runtime data variables and other types of data or information. Although specific functions are described for various types of memory, this is merely one example, and a different assignment of functions to types of memory is possible.

Example Methods of Implementing a Privacy Mode on an Electronic Device

Figure 4:
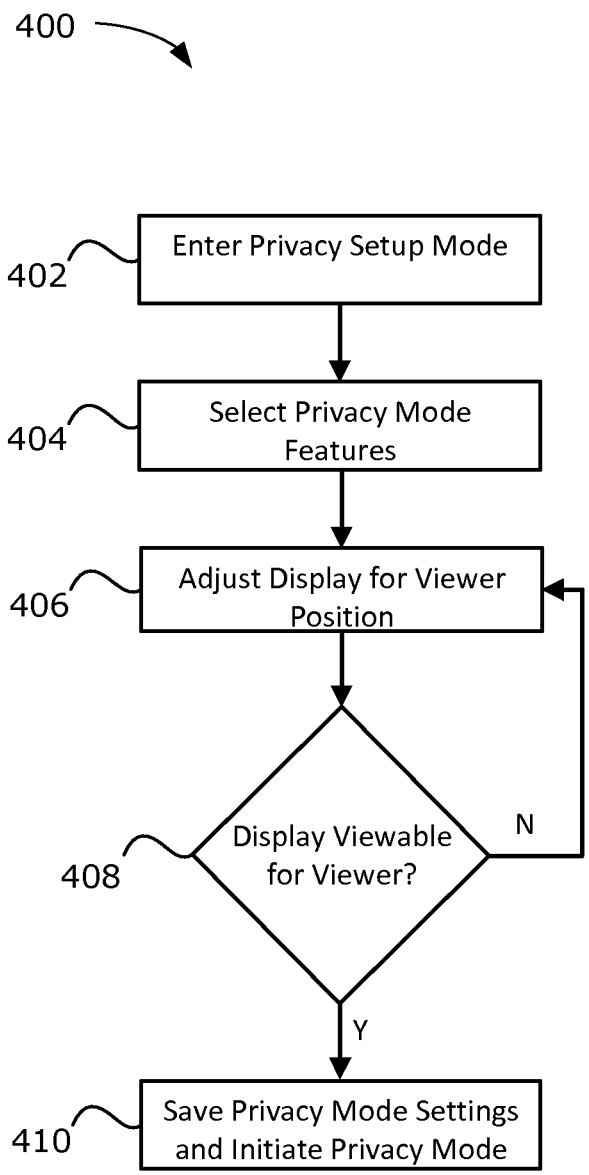
FIG. 4 is a flow-chart illustrating an example of a method of initiating a privacy mode on the electronic device shown in FIG. 1.

Referring to FIG. 4, an exemplary method 400 of initiating a privacy mode on an electronic device 201 will now be described. In one example, the method 400 can be implemented on an electronic device 201 having a processor 240, a display 204 coupled to the processor 240, a memory (244 and/or 246 and/or 248) coupled to the processor 240, and a camera (e.g., camera system 260 having the cameras 253 and/or 254) coupled to the processor 240. The method 400 may also make use of one or more sensors 301 coupled to the processor.

At 402, a privacy setup mode is entered. The privacy setup mode may be initiated by the security module 299 in response to a user providing input to the electronic device 201 indicating that the user wishes the privacy mode to be entered at 402. For example, a user may touch a touchscreen 204 in an appropriate place to provide input to the electronic device 201 indicating that a privacy mode is to be initiated.

Next, at block 404, privacy mode features may be selected. In one example, a user may be able to select whether he wishes an obfuscation mode to apply only to an active mode of the electronic device 201, only to an inactive mode of the electronic device 201, to both an inactive and an active mode of the electronic device 201, and the user may be able to select exactly what type of obfuscation he wishes applied by the electronic device 201.

A number of types of obfuscation may be available, for example the obfuscation applied by the electronic device may include anamorphic rendering applied to the image such that the image is clearly visible only from a selected viewing position, perspective rendering applied to the image such that the image is clearly visible only from the selected viewing position, three dimensional (3D) rendering applied to the image such that the image is clearly visible only from the selected viewing position, applying a second image to a background of the image such that the image becomes more difficult to discern, applying a blur to the image such that the image becomes more difficult to discern, and applying a blur to a portion of the image such that the image becomes more difficult to discern.

In one example, the block 404 may be optional. The electronic device 201 may be preconfigured with appropriate obfuscation selections and a user may not be prompted to select this. In another example, block 404 may be performed once in a configuration menu, for example using the security module 299, and the user may not have to make these selections each time the privacy setup mode is entered.

Once the selections performed by block 404 are satisfied, either by user selection or by loading preconfigured options (e.g., from the memory 244), the method 400 provides for adjusting the display according to viewer (e.g., user) position. Blocks 406 and 408 may form an iterative process where the electronic device 201 continuously or nearly continuously displays an obfuscated image according to the settings entered or loaded at the block 404. For example, the electronic device 201 may show text that has been rendered in an anamorphic fashion and the anamorphic rendering may be continuously changed according to different optimal viewing positions until the user indicates at the block 408 that an optimal or nearly optimal anamorphic rendering has been shown on the display 204 according to the user's viewing position.

The electronic device 201 may use input signals provided by the sensors 301 and/or the front facing camera 253 in order to predict where or approximately where the user's viewing position is. For example, the electronic device 201 may use signals provided by an accelerometer and/or a gyroscope (e.g., the sensors 301) to the processor 240 to predict what position the electronic device 201 is being held in (e.g., the electronic device 201 may be held vertically with respect to gravity in front of the user). The electronic device 201 may also use image input provided by the front facing camera 253 to see where the user is positioned relative to the electronic device 201. Input from the sensors 301 and/or the front facing camera 253 may enable the security module 299 to reduce the amount of time and processing needed to complete the display adjustment for viewer position at the blocks 406 and 408 by placing realistic bounds on the expected viewing position of the user relative to the electronic device 201. Once the user provides an input to the wireless device 201 (e.g., by touching an appropriate location on the touchscreen 204) indicating that the user believes the optimal or nearly optimal obfuscated rendering has been shown on the display 204 for the viewer's present viewing position, the security module 299 may save in memory (e.g., the RAM 246 and/or the flash memory 244) the user's selection as privacy mode settings at a block 410. At block 410, the security module 299 may be able to calculate with a fairly high degree of accuracy the user's viewing position based on the optimal or nearly optimal image chosen by the user and the security module 299 may save the user's viewing position in the RAM 246 and/or the flash memory 244. The security module 299 may also save in the RAM 246 and/or the flash memory 244 the position of the electronic device 102 at the time that the user indicated that the optimal or nearly optimal image was presented on the display 204. In other words, at the time that the user indicated that the optimal or nearly optimal image was displayed on the display 204, the security module 299 may be able to determine both the approximate position in space of the electronic device 102 and the approximate location in space of the viewer's position relative to the electronic device 102, and this data may be saved in the RAM 246 and/or the flash memory 244 for later use. The privacy mode may then be initiated.

Figure 5:
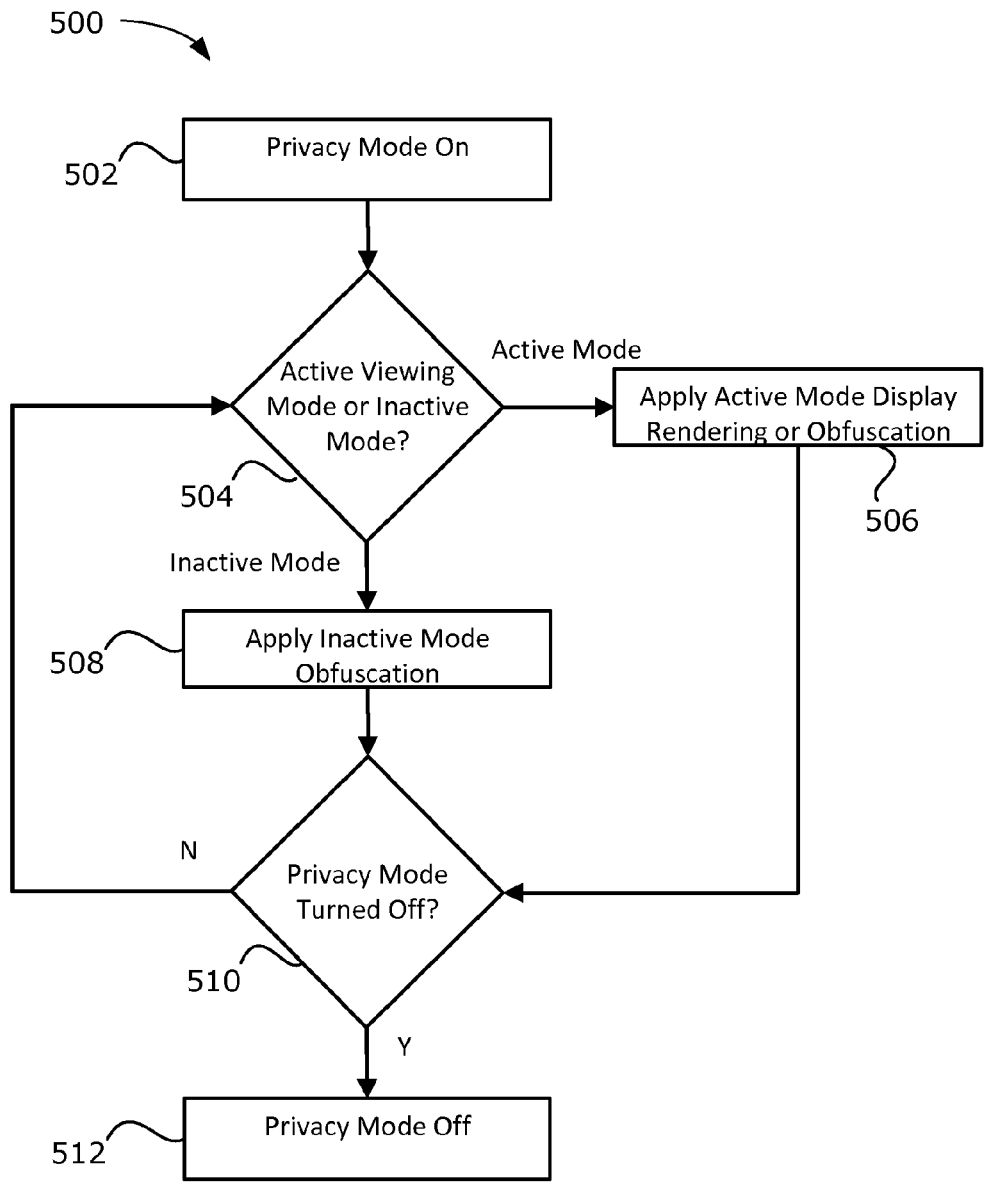
FIG. 5 is a flow-chart illustrating an example of a method of operation of a privacy mode of the electronic device FIG. 1.

Referring next to FIG. 5, a flow-chart is shown illustrating an example of a method 500 of operation of a privacy mode of the electronic device 102. In one example, the method 500 can be implemented on an electronic device 201 having a processor 240, a display 204 coupled to the processor 240, a memory (244 and/or 246 and/or 248) coupled to the processor 240, and a camera (e.g., camera system 260 having the cameras 253 and/or 254) coupled to the processor 240. The method 500 may also make use of one or more sensors 301 coupled to the processor.

At a first block 502, the privacy mode is on, subsequent to the initiation of the privacy mode at the block 410 shown in FIG. 4.

Next, at a block 504, the security module 299 may determine whether the electronic device 201 is in an active viewing mode or an inactive viewing mode. In one example, an inactive viewing mode may be invoked when the electronic device 201 has been sitting idle on a flat surface such as a desk for a minimum amount of time or when the electronic device 201 has not received any user input for a minimum amount of time. In one example, the electronic device may also use input from the sensors 301 to make the determination at block 504. For example, when the electronic device 201 is in approximately the same position in space as the position of the electronic device 201 at the time that the user indicated the optimal or nearly optimal image at the block 408, the electronic device 201 may be considered to be in use and therefore be in an active viewing mode. Conversely, when the electronic device 201 is not in approximately the same position in space as the position of the electronic device 201 at the time that the user indicated the optimal or nearly optimal image at the block 408, the electronic device 201 may be considered not to be in use and therefore be in an inactive viewing mode. Additional factors may be considered when distinguishing between the active viewing mode and the inactive viewing mode. In one example, the electronic device 201 may remain in the active viewing mode until: (a) the electronic device 201 is not in approximately the same position in space as the position of the electronic device 201 at the time that the user indicated the optimal or nearly optimal image at the block 408, and (b) no user input has been received by the electronic device 201 for a minimum amount of time (e.g., 1 minute). While some examples have been provided of criteria for selecting between the active viewing mode and the inactive viewing mode at the block 504, any suitable criteria may be applied according to the design criteria of a particular application.

Based on the determination made at block 504, the electronic device 201 may apply obfuscation to an image displayed on the display 204 when the privacy mode is engaged on the electronic device 201 and when the electronic device 201 is in an active viewing mode and the electronic device 201 may apply a second obfuscation to the image displayed on the display 204 when the privacy mode is engaged on the electronic device 201 and when the electronic device 201 is in an inactive viewing mode.

When it is determined at the block 504 that the electronic device 201 is in an active mode, the security module 299 applies active mode display rendering or obfuscation to the display 204 at a block 506. When the privacy mode is engaged on the electronic device 201, the user will typically be holding the device and using the device and normally the active viewing mode would be the first viewing mode chosen or detected at the block 504.

The active mode display rendering or obfuscation applied at block 506 may be done in several ways. In one example, the obfuscation may be achieved using anamorphic rendering applied to the image such that the image is clearly visible only from the selected viewing position of the user. In another example, the obfuscation may be achieved using perspective rendering applied to the image such that the image is clearly visible only from the selected viewing position of the user. In another example, the obfuscation may be achieved using three dimensional (3D) rendering applied to the image such that the image is clearly visible only from the selected viewing position of the user. In another example, the obfuscation may be achieved by applying a second image to a background of the image such that the image becomes more difficult to discern by others not at the selected viewing position of the user. In another example, the obfuscation may be achieved by applying a blur to the image such that the image becomes more difficult to discern by others not at the selected viewing position of the user. In another example, the obfuscation may be achieved by applying a blur to a portion of the image such that the image becomes more difficult to discern by others not at the selected viewing position of the user. The many examples provided above of techniques for image obfuscation may be applied only one at a time, or in suitable combinations such that the image is only clearly visible from the selected viewing position of the user.

In one example, the image to which obfuscation is applied may include primarily text. Security issues typically arise primarily where an unauthorized observer is able to read a message or document on the display 204. As such, the anamorphic rendering, perspective rendering or 3D rendering mentioned above may be applied to the font of text. In another example, special fonts may be used for the purpose of displaying text on the display 204 using the anamorphic rendering, perspective rendering or 3D rendering mentioned above. In another example, a background image may be applied to the text shown on the display 204, making the text more difficult to discern by others not at the selected viewing position of the user. In another example, blur may be applied to the text shown on the display 204, making the text more difficult to discern by others not at the selected viewing position of the user. In another example, blur may be applied to display elements other than the text shown on the display 204, making the text more difficult to discern by others not at the selected viewing position of the user.

The selected viewing position may be maintained at the block 506 regardless of a position in space of the electronic device 201 relative to the selected viewing position. The security module 299 that implements the privacy mode on the electronic device 201 may use input provided by the sensors 301 (e.g., accelerometer, magnetometer and/or gyroscope) and/or input provided by the front facing camera 253 to monitor both any changing position of the electronic device 201 and any changing position of the user while the active viewing mode is maintained. The security module may make adjustments to the rendering or obfuscation applied to the display 204 as the electronic device 201 and/or the user move slightly in free space such that the image shown on the display 204 remains consistent with the selected viewing position (e.g., the position occupied by the user remains the optimal viewing position for viewing the content rendered on the display 204, even when the electronic device 201 and/or the user shift slightly). Optionally, if the electronic device 201 and/or the user move too much (e.g., beyond a defined threshold) during the method 500, the electronic device 201 may either display a warning to the user to prompt the user to adjust his position and/or the position of the electronic device 201 to return closer to the positions chosen at the block 408, or the electronic device 201 may suspend or terminate the method 500.

When it is determined at the block 504 that the electronic device 201 is in an inactive viewing mode, a second obfuscation may be applied to the display 204. The second obfuscation applied at the block 508 in an inactive mode of the wireless device 201 may be different from the obfuscation applied at the block 506. For example, the second obfuscation may be anything that makes the image on the display 204 largely or substantially illegible, or the second obfuscation may simply be a picture, photo, design, pattern, etc., that does not convey any confidential information. For example, if a user of the wireless device 201 is using the wireless device 201 on an airplane and lies the device down on the tray in front of him, the block 504 may switch from the active viewing mode to the inactive viewing mode when the needed criteria are met and change the image on the display 204 using the second obfuscation such that people sitting next to the user may not be able to see any information whatsoever on the user's display 204. In some examples, the second obfuscation may simply be a blank display 204 or power saving mode of the display 204. In other examples, the inactive mode may be entirely optional and the obfuscation applied in the active mode at the block 506 may be sufficient to render the image on the display 204 very difficult to read when the reader is not in the selected viewing position.

Blocks 504, 506, 508, and 510 may form a loop or iterative operation where the security module 299 constantly or nearly constantly monitors the state of use of the electronic device 201 and maintains the electronic device 201 in either the active mode or inactive mode until the user disables the privacy mode at block 510. The user may disable the privacy mode at 510 in any suitable manner, such as by touching an appropriate button on the touchscreen 204 or by pressing a physical button on the electronic device 201, in which case the privacy mode is disabled at the block 512 and the method 500 terminates.

While display elements, buttons, etc. are described in the present description as the primary means of facilitating interaction between the electronic device 201 and the user of the electronic device 201, suitable gestures applied to the touchscreen 204 may also be used as a means of providing input to the security module 299.

Figure 6:
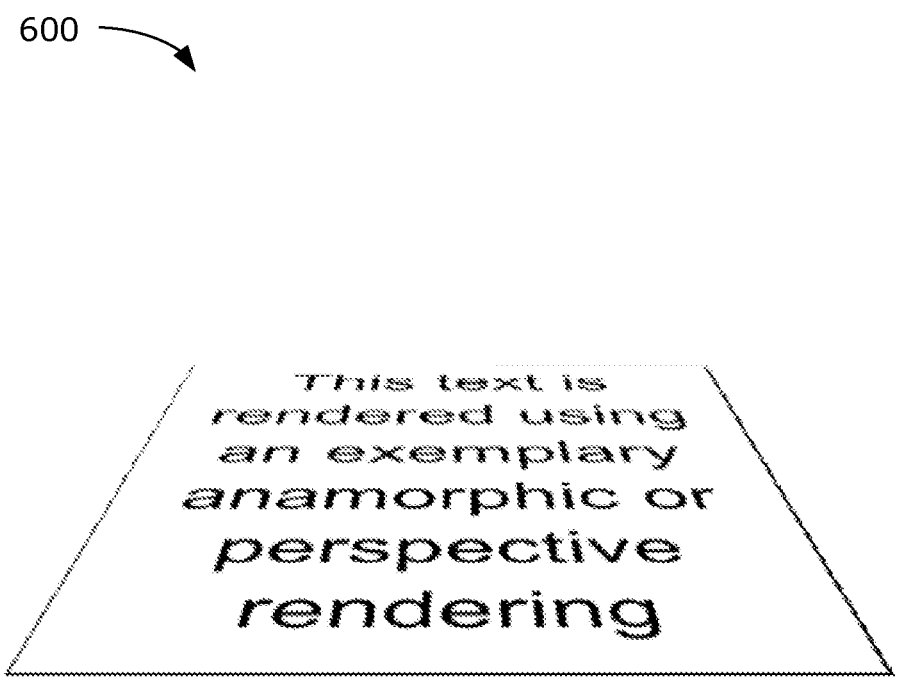
FIG. 6 illustrates an exemplary rendering technique for use in the privacy mode described in FIGS. 4 and 5.

Referring now to FIG. 6, an exemplary rendering technique 600 is shown for use in the privacy mode described in FIGS. 4 and 5. In one example, rendering technique 600 may show text rendered using an anamorphic or perspective rendering technique. In the example shown in FIG. 6, the text may be rendered using a non-extruded example of an anamorphic or perspective rendering technique. In other examples, the text may be extruded when using any of a 3D, anamorphic, or perspective rendering technique. While the rendering technique 600 is shown as an example, any suitable rendering technique may be used that makes it more difficult to viewers to view when they are not at the selected viewing position of the user.

While the present application is primarily described in terms of methods, a person of ordinary skill in the art will understand that the present application is also directed to various apparatus' such as an electronic device 201 including a mobile communications device or camera. The electronic device 201 includes components for performing at least some of the aspects and features of the described methods, which may be by way of hardware components (such as the memory 244 and/or the processor 240), software or any combination of the two, or in any other manner. Moreover, an article of manufacture for use with the apparatus, such as a pre-recorded storage device or other similar computer readable storage medium including program instructions recorded thereon, or a computer data signal carrying computer readable program instructions may direct an apparatus to facilitate the practice of the described methods. For example, a non-transitory computer readable storage medium may include computer executable instructions tangibly embodying code for performing one or more of the methods described herein. It is understood that such apparatus and articles of manufacture also come within the scope of the present application.

The term "computer readable medium" or "computer readable storage medium" as used herein means any medium which can store instructions for use by or execution by a computer or other computing device including but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

One or more embodiments have been described by way of example. It will be apparent to persons skilled in the art that a number of variations and modifications can be made without departing from the scope of what is defined in the claims.

What is claimed is the following:

1. An electronic device comprising:
  a processor;
  a display coupled to the processor for displaying content;
  a memory coupled to the processor; and
  a security module saved in the memory, the security module for configuring the processor to:
    apply a first obfuscation to the content displayed on the display when a privacy mode is engaged on the electronic device and when the electronic device is in an active viewing mode in which the electronic device is actively being used, wherein applying the first obfuscation includes anamorphic rendering the content at a first threshold such that the content appears undistorted when viewed from a selected viewing position and appears distorted when viewed from other viewing positions, wherein the selected viewing position is defined by a selected viewing angle of a user of the electronic device with respect to the display of the electronic device; and
    apply a second obfuscation to the content displayed on the display when the privacy mode is engaged on the electronic device and when the electronic device is in an inactive viewing mode in which the electronic device is not actively being used, wherein the second obfuscation is different from the first obfuscation.

2. The electronic device according to claim 1, wherein applying the second obfuscation includes anamorphic rendering the content at a second threshold greater than the first threshold such that the content appears distorted when viewed from the selected viewing position.

3. The electronic device according to claim 1, wherein applying the first obfuscation comprises at least one of: perspective rendering applied to the content such that the content appears undistorted when viewed is from the selected viewing position, three dimensional (3D) rendering applied to the content such that the content appears undistorted when viewed from the selected viewing position, applying a second content to a background of the content such that the content becomes more difficult to discern, applying a blur to the content such that the content becomes more difficult to discern, or applying a blur to a portion of the content such that the content becomes more difficult to discern.

4. The electronic device according to claim 1, wherein the security module further configures the processor to:
  determine whether the electronic device is in an active viewing mode or an inactive viewing mode, before applying the first or second obfuscation to the content.

5. The electronic device according to claim 1, wherein the selected viewing position is maintained regardless of a position in space of the electronic device relative to the selected viewing position.

6. A method of implementing a privacy mode on an electronic device having a processor coupled to a display and a memory, the method comprising:
  applying a first obfuscation to content displayed on the display when the privacy mode is engaged on the electronic device and when the electronic device is in an active viewing mode in which the electronic device is actively being used, wherein applying the first obfuscation includes anamorphic rendering the content at a first threshold such that the content appears undistorted when viewed from a selected viewing position and appears distorted when viewed from other viewing positions, wherein the selected viewing position is defined by a selected viewing angle of a user of the electronic device with respect to the display of the electronic device; and
  applying a second obfuscation to the content displayed on the display when the privacy mode is engaged on the electronic device and when the electronic device is in an inactive viewing mode in which the electronic device is not actively being used, wherein the second obfuscation is different from the first obfuscation.

7. The method according to claim 6, wherein applying the second obfuscation includes anamorphic rendering the content at a second threshold greater than the first threshold such that the content appears distorted when viewed from the selected viewing position.

8. The method according to claim 6, wherein applying the first obfuscation comprises at least one of: perspective rendering applied to the content such that the image appears undistorted when viewed from the selected viewing position, three dimensional (3D) rendering applied to the content such that the content appears undistorted when viewed from the selected viewing position, applying a second content to a background of the content such that the content becomes more difficult to discern, applying a blur to the content such that the content becomes more difficult to discern, or applying a blur to a portion of the content such that the content becomes more difficult to discern.

9. The method according to claim 6, further comprising:
  determining whether the electronic device is in an active viewing mode or an inactive viewing mode, before applying the first or second obfuscation to the content.

10. The method according to claim 6, wherein the selected viewing position is maintained regardless of a position in space of the electronic device relative to the selected viewing position.

11. A non-transitory machine readable having tangibly stored thereon executable instructions for execution by a processor of an electronic device medium storing instructions that when executed by an electronic device, the electronic device having a processor coupled to a display and a memory, wherein the executable instructions, when executed by the processor of the electronic device, cause the processor to:
  apply a first obfuscation to content displayed on the display when the privacy mode is engaged on the electronic device and when the electronic device is in an active viewing mode in which the electronic device is actively being used, wherein applying the first obfuscation includes anamorphic rendering the content at a first threshold such that the content appears undistorted when viewed from a selected viewing position and appears distorted when viewed from other viewing positions, wherein the selected viewing position is defined by a selected viewing angle of a user of the electronic device with respect to the display of the electronic device; and apply a second obfuscation to the content displayed on the display when the privacy mode is engaged on the electronic device and when the electronic device is in an inactive viewing mode in which the electronic device is not actively being used, wherein the second obfuscation is different from the first obfuscation.

12. The non-transitory machine readable according to claim 11, wherein applying the second obfuscation includes anamorphic rendering the content at a second threshold greater than the first threshold such that the content appears distorted when viewed from the selected viewing position.

13. The electronic device of claim 1, wherein applying the second obfuscation includes deactivating the display of the electronic device.

14. The electronic device of claim 1, wherein the security module configures the processor to:
   determine, using one or more sensors, a viewing angle of the user of the electronic device with respect to the display of the electronic device;
   adjust to the first obfuscation in accordance with the determined viewing angle to such that the content appears undistorted when viewed from the selected viewing position when a difference between the determined viewing angle and the selected viewing angle is within a viewing angle threshold.

15. The electronic device of claim 14, wherein the security module configures the processor to:
   display a message on the display to prompt the user to return to the selected viewing angle when the difference between the determined viewing angle and the selected viewing angle exceeds the viewing angle threshold.

16. The electronic device of claim 14, wherein the security module configures the processor to:
   suspend the privacy mode when the difference between the determined viewing angle and the selected viewing angle exceeds the viewing angle threshold.

17. The method of claim 6, wherein applying the second obfuscation includes deactivating the display of the electronic device.

18. The method of claim 6, further comprising:
   determining, using one or more sensors, a viewing angle of the user of the electronic device with respect to the display of the electronic device;
   adjusting to the first obfuscation in accordance with the determined viewing angle to such that the content appears undistorted when viewed from the selected viewing position when a difference between the determined viewing angle and the selected viewing angle is within a viewing angle threshold.

19. The electronic device of claim 18, further comprising:
   displaying a message on the display to prompt the user to return to the selected viewing angle when the difference between the determined viewing angle and the selected viewing angle exceeds the viewing angle threshold.

20. The electronic device of claim 18, further comprising:
   suspending the privacy mode when the difference between the determined viewing angle and the selected viewing angle exceeds the viewing angle threshold.

21. The non-transitory machine readable medium according to claim 11, wherein applying the first obfuscation comprises at least one of: perspective rendering applied to the content such that the content appears undistorted when viewed from the selected viewing position, three dimensional (3D) rendering applied to the content such that the content appears undistorted when viewed from the selected viewing position, applying a second content to a background of the content such that the content becomes more difficult to discern, applying a blur to the content such that the content becomes more difficult to discern, or applying a blur to a portion of the content such that the content becomes more difficult to discern.

22. The non-transitory machine readable medium according to claim 11, wherein applying the second obfuscation includes deactivating the display of the electronic device.

23. The non-transitory machine readable according to claim 11, wherein the executable instructions, when executed by the processor of the electronic device, cause the processor to:
   determine, using one or more sensors, a viewing angle of the user of the electronic device with respect to the display of the electronic device;
   adjust to the first obfuscation in accordance with the determined viewing angle to such that the content appears undistorted when viewed from the selected viewing position when a difference between the determined viewing angle and the selected viewing angle is within a viewing angle threshold.

24. The non-transitory machine readable according to claim 23, wherein the executable instructions, when executed by the processor of the electronic device, cause the processor to:
   display a message on the display to prompt the user to return to the selected viewing angle when the difference between the determined viewing angle and the selected viewing angle exceeds the viewing angle threshold.

25. The non-transitory machine readable according to claim 23, wherein the executable instructions, when executed by the processor of the electronic device, cause the processor to:
   suspend the privacy mode when the difference between the determined viewing angle and the selected viewing angle exceeds the viewing angle threshold.

* * * * *